(12) United States Patent
Yacoub

(10) Patent No.: US 8,635,863 B2
(45) Date of Patent: Jan. 28, 2014

(54) PARTICULATE FILTER AND ASSOCIATED METHODS FOR EXHAUST PURIFICATION

(75) Inventor: Yasser Mohamed Sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 13/472,256

(22) Filed: May 15, 2012

(65) Prior Publication Data

US 2012/0291422 A1    Nov. 22, 2012

(30) Foreign Application Priority Data

May 20, 2011    (DE) .................. 10 2011 076 154

(51) Int. Cl.
- F01N 3/00    (2006.01)
- F01N 3/02    (2006.01)
- F01N 3/20    (2006.01)

(52) U.S. Cl.
USPC .............. 60/310; 60/286; 60/295; 60/297; 60/311

(58) Field of Classification Search
USPC .......................... 60/286, 295, 297, 310, 311
See application file for complete search history.

(56) References Cited

U.S. PATENT DOCUMENTS

| | | | | |
|---|---|---|---|---|
| 4,264,344 A * | 4/1981 | Ludecke et al. | ................ | 55/313 |
| 4,651,524 A * | 3/1987 | Brighton | ........................ | 60/274 |
| 5,212,948 A * | 5/1993 | Gillingham et al. | ............ | 60/288 |
| 5,357,755 A * | 10/1994 | Gillingham et al. | ............ | 60/288 |
| 5,701,735 A * | 12/1997 | Kawaguchi | ..................... | 60/274 |
| 2003/0192306 A1* | 10/2003 | Nakatani et al. | ................ | 60/288 |
| 2007/0144149 A1* | 6/2007 | Kolavennu et al. | ............. | 60/286 |
| 2007/0294999 A1* | 12/2007 | Yoshizaki et al. | ............... | 60/274 |
| 2008/0092528 A1* | 4/2008 | Toshioka et al. | ............... | 60/286 |
| 2010/0083646 A1* | 4/2010 | Poppe | ............................. | 60/311 |
| 2011/0047973 A1* | 3/2011 | Wilhelm et al. | ................ | 60/274 |
| 2011/0126524 A1* | 6/2011 | Askew | ............................. | 60/287 |
| 2011/0138782 A1* | 6/2011 | Stieglbauer | ..................... | 60/274 |
| 2012/0117946 A1* | 5/2012 | Gonze et al. | .................... | 60/274 |

FOREIGN PATENT DOCUMENTS

| | | | |
|---|---|---|---|
| DE | 10206805 A1 | 8/2003 | |
| DE | 102004048135 A1 | 4/2006 | |
| EP | 1947303 A1 | 7/2008 | |
| JP | 03294614 A * | 12/1991 | ............... F01N 3/02 |
| JP | 7279646 A | 10/1995 | |

OTHER PUBLICATIONS

Machine Translation Abstract JP 03294614 Done Sep. 24, 2013.*

* cited by examiner

*Primary Examiner* — Thomas Denion
*Assistant Examiner* — Dapinder Singh
(74) *Attorney, Agent, or Firm* — Julia Voutyras; Alleman Hall McCoy Russell & Tuttle LLP

(57) ABSTRACT

A particulate filter for a vehicle exhaust system includes a primary filter surrounded by a secondary filter and a quenching agent injection nozzle arranged upstream of the primary filter. In a normal mode, exhaust flows through the primary filter, and in a fail-safe mode or a mixed mode, at least some exhaust flows through the secondary filter and quenching agent is injected via the nozzle to cool the primary filter. The fail-safe or mixed modes may be enacted during an overload of the primary filter, for example. If engine shutdown is initiated during regeneration of the primary filter, a rate of quenching agent injection may be adjusted so that the regeneration may be completed at a safe temperature.

19 Claims, 5 Drawing Sheets

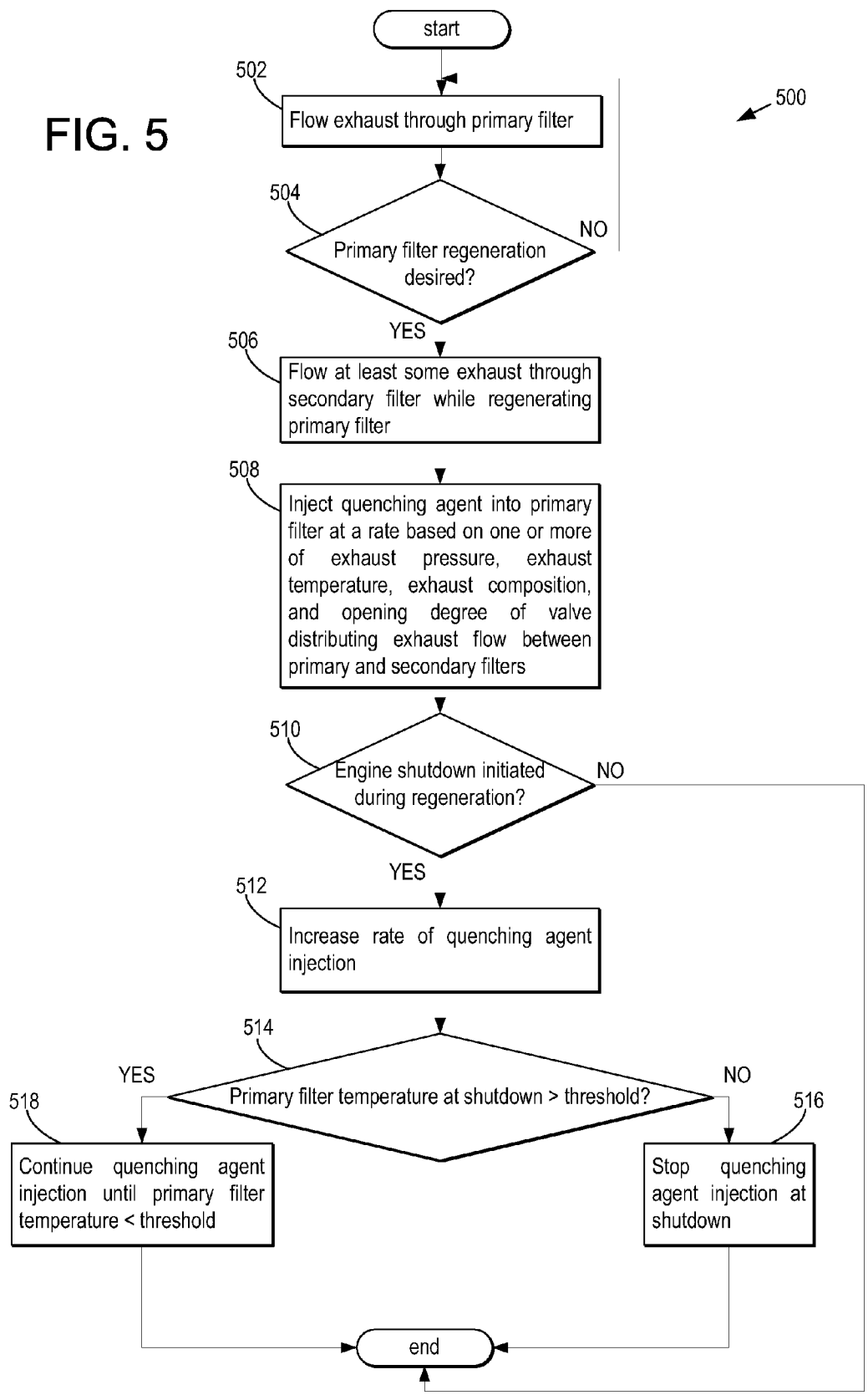

US 8,635,863 B2

PARTICULATE FILTER AND ASSOCIATED METHODS FOR EXHAUST PURIFICATION

RELATED APPLICATIONS

The present application claims priority to German Patent Application No. 10 2011 076 154.3, filed on May 20, 2011, the entire contents of which are hereby incorporated by reference for all purposes.

BACKGROUND AND SUMMARY

Particulate filters may be included in engine exhaust systems to retain particles generated during fuel combustion. As engine exhaust flows through a particulate filter, particles such as soot accumulate in the filter, thereby reducing undesirable exhaust emissions. Because such filters become overloaded with exhaust particles over time, they must be regenerated periodically. Particulate filter regeneration may involve heating the filter to such an extent that the loaded particles may "burn off" or combust. In addition to reducing the particle loading so that additional particles may be retained, particulate filter regeneration helps to ensure a controlled level of exhaust-gas counter-pressure (i.e., pressure exerted on the flow of exhaust by the particulate filter, which may adversely affect engine performance).

However, regeneration alone may not address all of the issues associated with overloading of particulate filters. For example, in the case of high soot loading, the exothermic heat generated during spontaneous soot combustion may damage parts of the exhaust system, and the heat associated with filter regeneration may cause further soot combustion and thus further damage to the exhaust system.

Further, the heat of the regeneration process may be hazardous in some conditions. For example, if a vehicle's engine is shut down during particulate filter regeneration and the vehicle parked in an area with tall grass or other obstructions near the tail pipe, the combination of the heat of regeneration and ignitable materials near the tail pipe may result in a fire starting.

Various approaches are known for addressing the issues associated with overloading of particulate filters. In one example approach, DE 102 06 805 A1 describes a soot filter for the purification of exhaust gases which has a predetermined breaking point for reducing an exhaust-gas counter-pressure. The predetermined breaking point may be arranged in a filter body of the filter and/or in a bypass line of the filter. However, the inventors herein have recognized that such an approach compromises the functionality of the filter in order to reduce the exhaust-gas counter-pressure. As such, the breaking point approach may result in undesirable exhaust emissions, among other disadvantages.

To address the above issues, the inventors herein have identified a particulate filter and associated methods addressing the issue of particulate filter overloading without compromising the filter's ability to retain exhaust particles. Further, the inventors herein have identified example methods for mitigating dangers associated with engine shutdown during regeneration of a particulate filter.

In one example, a particulate filter for a vehicle exhaust system comprises a primary filter, a secondary filter, and a quenching agent injection nozzle arranged upstream of the primary filter. An exhaust-gas path runs through the primary filter in a normal mode and through the secondary filter in a fail-safe mode. In the fail-safe mode, the quenching agent injection nozzle delivers quenching agent to the primary filter. By delivering quenching agent to the primary filter in the fail-safe mode, exothermic heat generated during the sudden combustion of stored soot particles may be limited by means of the quenching agent, thereby reducing damage to the exhaust system. Further, because the exhaust-gas path runs through the secondary filter when the primary filter is overloaded, the exhaust gas continues to be filtered even during primary filter overload. In this way, emissions regulations may still be adhered to and damage to the exhaust system may be prevented despite overloading of the primary filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 is an example method for operating the particulate filter of FIGS. 1-3 during regeneration.

DETAILED DESCRIPTION

The following description relates to a particulate filter and associated methods for purifying engine exhaust.

Figure 1:
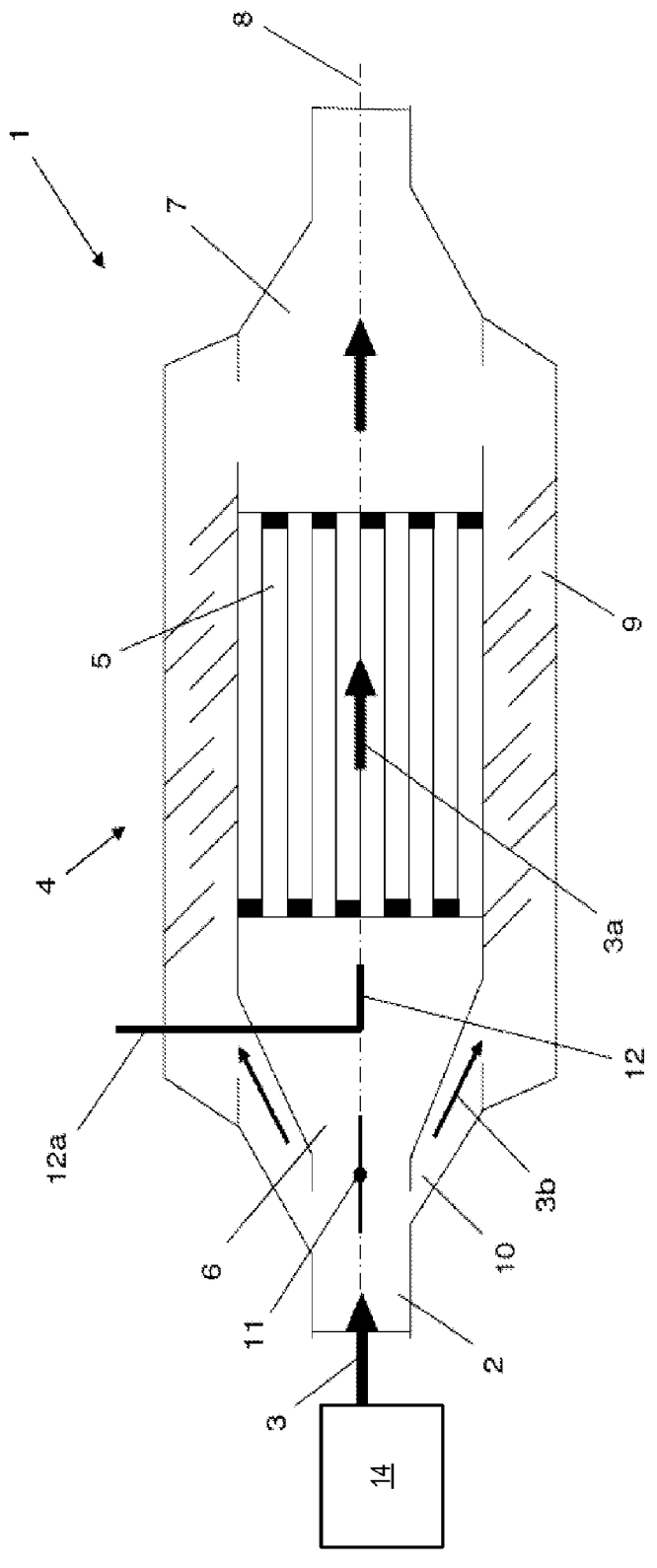
FIG. 1 is a cross-sectional view of an example particulate filter operating in a normal mode.

FIG. 1 shows an exhaust system or exhaust-gas aftertreatment system 1 coupled to an internal combustion engine 14, which may be an engine of a motor vehicle. In some examples, engine 14 is a diesel engine. Exhaust gas generated by the internal combustion engine flows in an exhaust-gas flow or path 3 through an exhaust line 2 in the direction of an outlet or exhaust tailpipe.

Arranged in the exhaust line 2 is a particulate filter 4, which may also be a constituent part of the exhaust line 2 or of the exhaust system 1. Particulate filter 4 filters particles out of the exhaust-gas flow 3 in order to reduce emissions. Exhaust-gas flow 3 runs in particulate filter 4 along one or more exhaust-gas paths 3a and 3b. Particulate filter 4 may have a cylindrical form, which harmonizes well with the tubular exhaust system.

Particulate filter 4 includes a primary filter 5 and a secondary filter 9. The primary filter and the secondary filter may each be designed as a wall-flow filter or a through-flow filter. These filter types are highly suitable for the particulate filter. In the example depicted in FIGS. 1-3, the primary filter is formed as a wall-flow filter, and the secondary filter formed as a through-flow filter. In accordance with this example, due to its design as a wall-flow filter, the primary filter must be periodically regenerated. During the regeneration of the primary filter, the secondary through-flow filter may be available for exhaust-gas purification. It will be appreciated that filters 5 and 9 may be any other suitable type of filter without departing from the scope of this disclosure.

Arranged upstream of primary filter 5 is an inlet region 6 of primary filter 5. Inlet region 6 widens the cross-section of exhaust line 2 to the larger cross-section of primary filter 5.

Arranged downstream of primary filter 5 is an outlet region 7 which narrows the cross-section of primary filter 5 to the smaller cross-section of exhaust line 2. The filter 5 and the particulate filter 4 are, overall, of rotationally symmetrical design with respect to an axis of rotation 8. The inner region of the filter 5, in particular flow ducts and/or walls, need not be rotationally symmetrical.

As shown in FIG. 1, primary filter 5 is surrounded by a secondary filter 9. This is a good arrangement from a flow aspect, and furthermore saves space and is compatible with established installation dimensions. Like primary filter 5, secondary filter 9 contains filter elements, for example ducts, walls and/or suitable material. Secondary filter 9 is structurally separate from primary filter 5, in that exhaust-gas flow 3 does not communicate the between filters 5 and 9. An inlet region 10 is arranged upstream of secondary filter 9. Thus, exhaust line 2 branches into the inlet regions 6 and 10 of the two filters 5 and 9. Inlet region 6 of primary filter 5 is arranged downstream of inlet region 10 of secondary filter 9. It will be appreciated that the expression "inlet region" encompasses both the inlet opening between the exhaust line 2 and the adjoining prechamber upstream of the actual filter and also the prechamber, or a combination of both.

A valve for diverting the exhaust-gas path may be arranged upstream of primary filter 5. The exhaust-gas flow can be split up between the two filters by means of said valve. The exhaust-gas flow passes either through the filter in the normal mode or through the secondary filter in a fail-safe mode. A mixed mode, in which the exhaust gas flow runs through both filters, is likewise possible. The valve permits precise control of the exhaust-gas flow. For example, as shown in FIG. 1, particulate filter 4 includes a valve 11 arranged in inlet region 6. Valve 11 connects the inlet region 6 and therefore the exhaust line 2 to the primary filter 5. The valve 11 may also be referred to as an inlet valve. FIG. 1 shows valve 11 in the open state. The function of the valve 11 will be described further below in conjunction with the further figures.

Valve 11 is arranged so as to directly control the exhaust-gas flow 3 into primary filter 5, in that valve 11 can decrease or increase the size of the cross-section leading to primary filter 5. Similarly, the flow of exhaust gas into secondary filter 9 is in a sense controlled indirectly by valve 11: when valve 11 is closed, a back-pressure builds up upstream of inlet region 6, whereupon exhaust-gas flow 3 runs (entirely or partially) through inlet region 10 of secondary filter 9. An opening degree of valve 11 may be controlled based on a state of the primary filter, for example a loading level of the primary filter. Alternatively, the opening degree of valve 11 may be controlled based on exhaust conditions or engine operating conditions, for example.

In addition to valve 11, (not illustrated) for diverting the exhaust-gas flow may be arranged in inlet region 10 of secondary filter 9. By means of said one or more further valves, the secondary filter may be closed off in order thereby to divert the exhaust-gas flow entirely through the primary filter. It is also possible for a valve or a valve arrangement to be provided which controls both inlet regions 6, 10 and therefore both filters 5 and 9.

Figure 2:
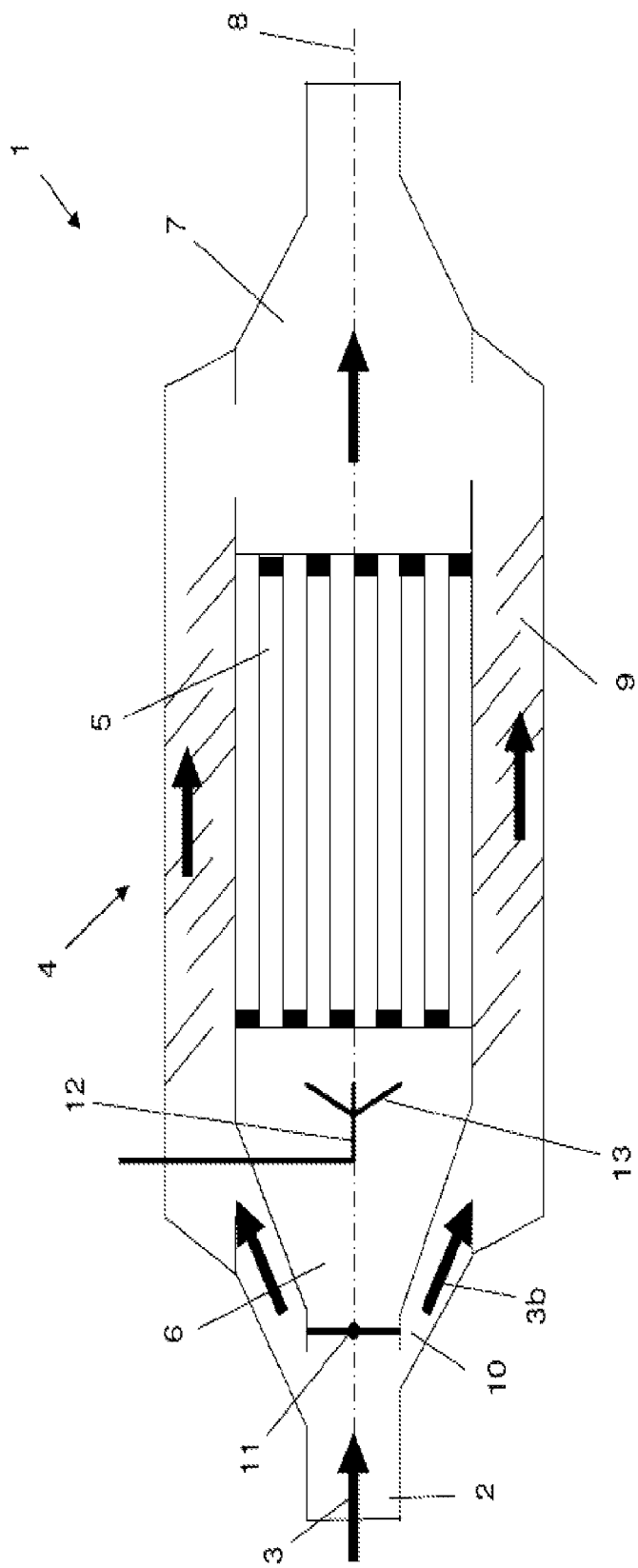
FIG. 2 is a cross-sectional view of the particulate filter of FIG. 1 operating in a fail-safe mode.
Figure 3:
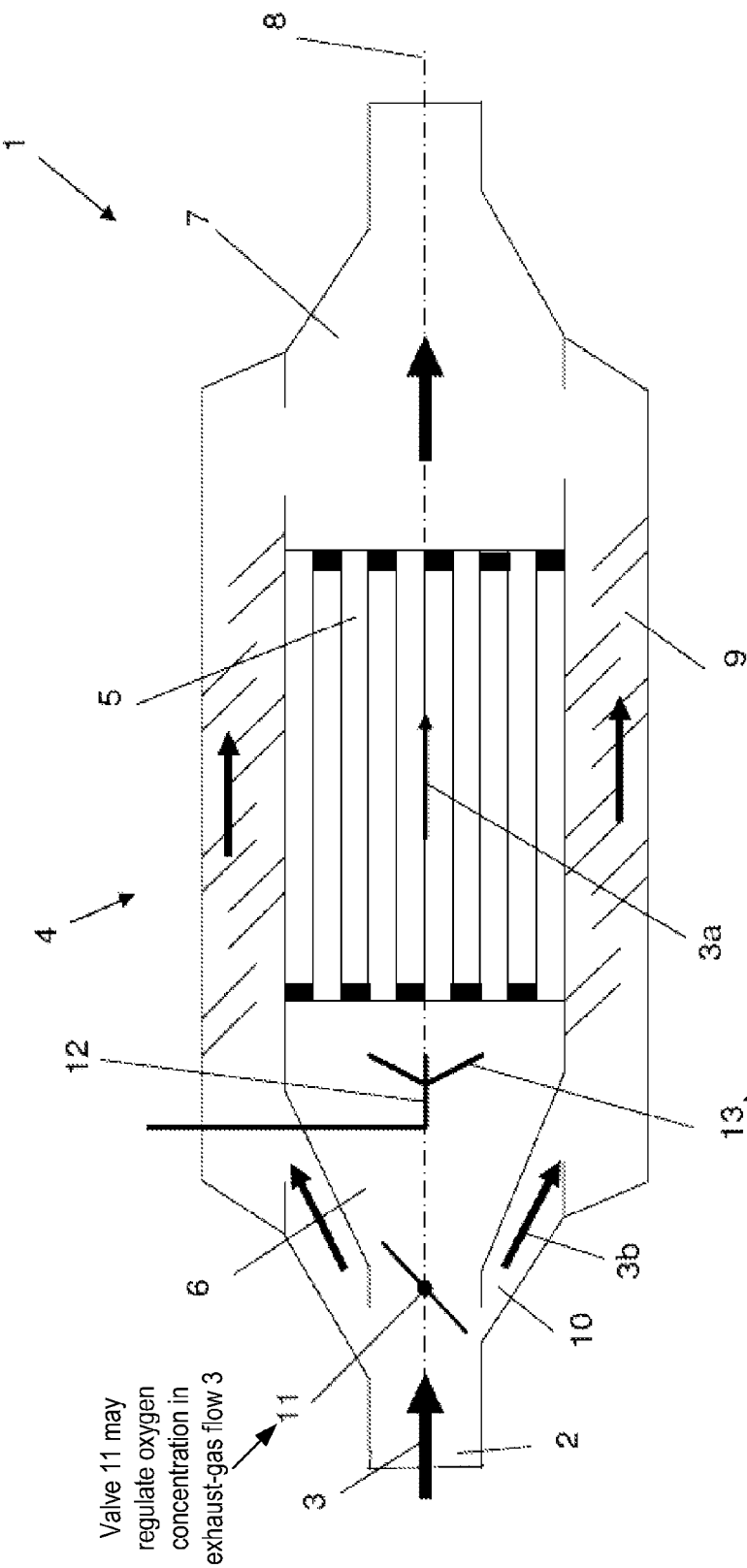
FIG. 3 is a cross-sectional view of the particulate filter of FIGS. 1 and 2 operating in a mixed mode.

Furthermore, a quenching agent injection nozzle 12 is arranged in inlet region 6 for injecting quenching agent 13 (as shown in FIGS. 2-3) into primary filter 5 or into the exhaust gas upstream of primary filter 5.

Quenching agent 13 may dissipate heat. For example, when injected into primary filter 5, quenching agent 13 may form a heat source for the exhaust gas flowing through the filter and lead to sudden cooling. In this way, quenching agent 13 may limit the exothermic heat generated by a sudden combustion of stored soot particles in the filter. Damage to the filter and to the rest of the exhaust-gas aftertreatment system may thus be prevented via injection of quenching agent, and emissions values may be improved.

Further, quenching agent 13 may regulate an oxygen concentration of exhaust gas. For example, the quenching agent may vaporize when it is introduced into the primary filter, e.g. due to the heat of the filter. The presence of vaporized quenching agent in the filter may limit quantities of oxygen gas in the accumulation chambers of the filter, thereby contributing to improved filter efficiency and better operation of the exhaust-gas aftertreatment system.

In addition to dissipating heat and/or lowering the oxygen concentration of exhaust gas, quenching agent 13 or further liquids or gases which can likewise be introduced by means of the quenching agent injection nozzle 12 may improve the emissions values of the exhaust gas and/or the further exhaust-gas aftertreatment.

Quenching agent 13 may comprise pressurized nitrogen, windshield wiper fluid, or a liquid such as water, for example. Other gases or liquids may likewise be used as long as they are suitable for dissipating heat and/or lowering the oxygen concentration of exhaust gas.

Quenching agent injection nozzle 12, which may also be referred to as an injection valve, and has one or more openings which introduce gaseous and/or liquid quenching agent or further media into the inlet region 6 or the primary filter 5. The dosing and/or mixing of the media may take place either in injection nozzle 12, feed line 12a, or an upstream tank or reservoir.

As a result of the arrangement of the quenching agent injection nozzle in an inlet region of the primary filter (as depicted in FIGS. 1-3), or close to an inlet surface of the filter, the quenching agent may pass into the primary filter in a targeted manner. Further, when the inlet region of the primary filter or the quenching agent injection nozzle is arranged downstream of the inlet region of the secondary filter (as in the example of FIGS. 1-3), it can be ensured that no quenching agent passes into the secondary filter.

Both valve 11 and quenching agent injection nozzle 12 may be controlled by a control system 15 including one or more control units 16 receiving information from a plurality of sensors 17 and sending control signals to a plurality of actuators 18, as depicted in FIG. 1. Control unit(s) 16 may receive input data from sensors 17, process the input data, and trigger actuators 18 in response to the processed input data based on instruction or code programmed therein corresponding to one or more routines. The control may be based on measured values from sensors 17, with measurement parameters including for example temperature, pressure, exhaust-gas composition or the like. Furthermore, operating modes or states of the engine, and/or of elements of the exhaust-gas aftertreatment system such as for example a catalytic converter, may also be taken into consideration.

When primary filter 5 is fully functional, e.g. not damaged or overloaded with particles, particulate filter 4 is in the normal mode depicted in FIG. 1. In the normal mode, valve 11 is fully open and quenching agent injection nozzle 12 is inactive. The exhaust-gas counter-pressure generated by particulate filter 4 is in a normal range which does not damage the engine or the exhaust system or cause a reduction in power. Exhaust-gas flow 3, which passes through exhaust line 2, flows through primary filter 5 in order to be purified. In the normal mode, therefore, exhaust-gas path 3a runs substantially through primary filter 5, and secondary filter 9 is not active. However, a small leakage flow or secondary flow through the secondary filter 9, along exhaust-gas path 3b, is acceptable. If a leakage flow is not desired, a further valve (not illustrated) may shut off in-flow to secondary filter 9. Otherwise, leakage flow through secondary filter 9 is controlled substantially by the ratio of flow restrictions posed by primary filter 5 and by secondary filter 9, and by the mass of soot accumulated primarily in primary filter 5.

During ongoing operation of engine 14, an ever-increasing number of particles are accumulated in primary filter 5, such that the loading of primary filter 5 with particles continuously increases, as a result of which the flow resistance of primary filter 5 increases. As a result, the exhaust-gas counter-pressure increases until it reaches a value at which the performance of engine 14 is impaired or there is a risk of damage to engine 14 or exhaust system 1. At this stage, particulate filter 4 switches into a fail-safe mode, as illustrated in FIG. 2. In the fail-safe mode, exhaust-gas path 3 runs through secondary filter 9, along exhaust-gas path 3b.

In the fail-safe mode, quenching agent 13 is dosed into primary filter 5. Quenching agent 13 may be pressurized nitrogen, water, or another liquid. In some examples, it may be advantageous to repurpose windshield wiper fluid as quenching agent 13. The introduction of quenching agent 13 may take place directly in primary filter 5, or indirectly by virtue of quenching agent 13 being mixed with exhaust gas upstream of primary filter 5. To control the path of exhaust-gas flow 3, valve 11 is closed, such that the exhaust gas runs only along flow path 3b through secondary filter 9. Quenching agent 13 acts firstly as a heat sink and, for example in the case of water injection, cools primary filter 5 and/or the exhaust gas flowing through primary filter 5. Furthermore, the expansion of the quenching agent which is introduced causes a sudden cooling. The cooling due to expansion of the quenching agent may advantageously limit the exothermic heat generated during a sudden combustion of particles such as soot in the filter, which would otherwise damage the filter and other elements of exhaust system 1 and/or engine 14. Furthermore, quenching agent 13 limits the oxygen concentration in the exhaust gas, as well as the filter's capacity to accumulate oxygen.

A trigger for changing the operating mode of particulate filter 4 from normal mode to fail-safe mode may be the exhaust-gas counter-pressure of primary filter 5 (and therefore of particulate filter 4). The exhaust-gas counter-pressure may be determined by means of a sensor 17, for example in the inlet regions or in the exhaust line 2. In some examples, if the exhaust-gas counter-pressure exceeds a certain threshold, which may be predefined and/or variable, control unit 16 sends a signal to an actuator 18 to close valve 11, such that the exhaust-gas path runs through secondary filter 9. Valve 11 may either be externally actuated, for example by a motor or a mechanical system, or internally opened and closed by means of a mechanism, such as a spring, arranged on or in the valve.

After the closing of valve 11, exhaust-gas flow 3 is filtered by secondary filter 9. After being filtered by secondary filter 9, the exhaust gases pass into outlet region 7 and from there into exhaust line 2.

In addition to introducing of quenching agent 13 into primary filter 5 while exhaust-gas flow 3 runs through the secondary filter 9, it is possible for a regeneration of primary filter 5 to be carried out while exhaust-gas flow 3 runs through the secondary filter 9 to restore the performance of primary filter 5. The regeneration may occur at the same time as the introduction of quenching agent, if appropriate, or may be carried out with a time offset. Quenching agent 13 may also be used to keep a regeneration within certain limits, or quickly terminate a regeneration.

In the example shown in FIGS. 1-3, secondary filter 9 is constructed such that, in the event of an overloading of the secondary filter 9, the filtering efficiency thereof falls and the exhaust-gas counter-pressure remains at a normal level. In other words, even in the event of a relatively long period of operation of secondary filter 9, the exhaust-gas counter-pressure does not increase to such an extent that the performance of engine 14 is reduced or the engine damaged.

Quenching agent injection nozzle 12 and valve 11 may be activated simultaneously or in succession, wherein either valve 11 or nozzle 12 may be activated first. Further, under some circumstances, only quenching agent injection nozzle 12 may be activated and valve 11 may remain deactivated (e.g., in the open position). For example, when the back-pressure caused by primary filter 5 or the loading thereof causes the exhaust gas to flow through the secondary filter 9, it may not be necessary to activate valve 11. Furthermore, valve 11 may be used for controlling the oxygen concentration in the exhaust gas in order to limit the rate of soot combustion, for example in order to adhere to certain emissions regulations.

When primary filter 5 has been regenerated and/or exchanged (wherein depending on the design of particulate filter 4, the primary filter 5 or the complete particulate filter 4 may be exchanged), the exhaust-gas flow runs through primary filter 5 again. Since the exhaust-gas counter-pressure is at a normal level again when primary filter 5 is in a correct state, the valve 11 is opened to resume flow of exhaust gas through primary filter 5. Alternatively, in cases where valve 11 is not activated during regeneration and exhaust gas flows through the secondary filter as a result of excessive back-pressure and/or overloading of the primary filter, the return to a normal level of counter-pressure and decrease in particle loading after regeneration and/or exchange of primary filter 5 may cause exhaust gas to resume flowing through primary filter 5.

FIG. 3 shows a mixed mode in which valve 11 is in an intermediate position between fully open (shown in FIG. 1) and fully closed (shown in FIG. 2). The mixed mode permits a high degree of flexibility, for example for adaptation to different operating states of the engine and/or exhaust-gas aftertreatment system. Furthermore, the mixed mode permits precise control of particulate filter 4 as a whole. Because exhaust-gas flow 3 is split up into two flow paths 3a, 3b through primary filter 5 and through secondary filter 9, such that exhaust gas flows through both the primary filter and the secondary filter, it is possible for parameters such as pressure, temperature, and composition of the exhaust gas to be controlled. Also, the introduction of quenching agent 13 and the regeneration of primary filter 5 may be influenced by the exhaust-gas quantity flowing through being influenced by means of the valve 11. For example, an amount of quenching agent 13 introduced or a rate of injection of quenching agent 13 may be based on an opening degree of valve 11. The rate of injection of quenching agent 13 may be directly proportional to an opening degree of valve 11, so as to inject more quenching agent into the primary filter as the quantity of exhaust gas flowing through it increases.

Figure 4:
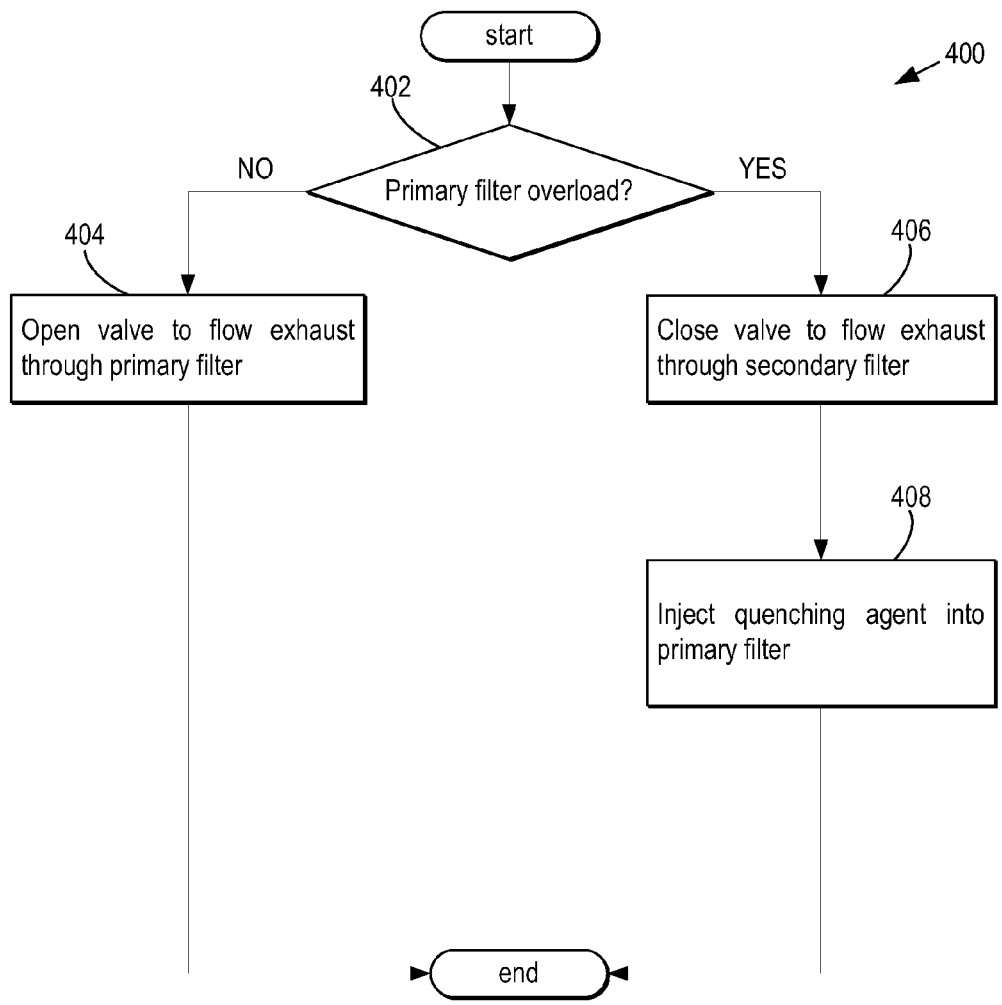
FIG. 4 is an example method for operating the particulate filter of FIGS. 1-3.

FIG. 4 is a flowchart of an example method 400 that may be used in conjunction with the example particulate filter 4 depicted in FIGS. 1-3. Method 400 may be stored as executable instructions in non-transitory memory of control unit 16 shown in FIG. 1. Method 400 may be performed periodically to ensure appropriate flow of exhaust gas in the case of primary filter overload. Alternatively, method 400 may be performed on an interrupt basis, such that an overload of the primary filter triggers performance of method 400.

At 402, method 400 includes determining whether the primary filter is overloaded. As one example, control system 15 may determine whether the primary filter is overloaded by sensing a pressure upstream of the primary filter to determine a level of exhaust-gas counter-pressure, where higher counter-pressure indicates more loading of the primary filter. In this case, a sensor 17 may be arranged in inlet region 6 of primary filter 5. Alternatively, overloading may be determined by sensing other parameter values such as rate of leakage exhaust flow through the secondary filter, or in a different manner.

If the primary filter is not overloaded, method 400 continues to 402. At 402, method 400 includes opening a valve to flow exhaust through the primary filter. The valve referred to at 402 may be valve 11 of FIGS. 1-3. In one example, an open state of valve 11 may be passively maintained at 404, as opposed to actively opening the valve. In another example, method 400 may be performed directly after a regeneration of the primary filter during which valve 11 was closed, and thus valve 11 may be actively opened at 404. To open valve 11, control unit 16 may send a signal to an actuator 18 associated with valve 11 after determining that the primary filter is not overloaded. It will be appreciated that in the fail-safe mode, opening valve 11 may include fully opening the valve, whereas in the mixed mode, opening valve 11 may include only partially opening the valve. After 402, method 400 ends.

However, if the primary filter is overloaded, method 400 continues from 402 to 406. At 406, method 400 includes closing a valve to flow exhaust through the secondary filter. To close valve 11, control unit 16 may send a signal to an actuator 18 associated with valve 11 after determining that the primary filter is overloaded. It will be appreciated that in the fail-safe mode, closing valve 11 may include fully closing the valve, whereas in the mixed mode, closing valve 11 may include only partially closing the valve. In this way, in the event of overloading of the primary filter, the exhaust-gas flow can run only through the secondary filter, or through the secondary filter and to a certain extent through the primary filter. Diverting at least some exhaust flow through the secondary filter may advantageously reduce exhaust-gas counter-pressure, thereby reducing the severity of the effects of fault states of the filter.

After 406, method 400 proceeds to 408. At 408, method 400 includes injecting quenching agent into the primary filter. For example, as described with respect to FIGS. 1-3, a quenching agent injection nozzle may be arranged in an inlet region of the primary filter, and the nozzle may dose a quenching agent such as water or nitrogen into the inlet region. During the fail-safe and mixed modes, quenching agent injection may be the only measure taken to reduce exhaust-gas counter-pressure associated with overloading of the primary filter and to reduce damage to the exhaust system due to the exothermic heat generated by spontaneous soot combustion in the overloaded filter. Alternatively, quenching agent injection may be performed in addition to or in conjunction with regeneration of the primary filter. Such operation is described further with respect to FIG. 5. After 408, method 400 ends.

FIG. 5 is a flowchart of an example method 500 that may be used in conjunction with the example particulate filter 4 depicted in FIGS. 1-3. Further, method 500 may be used in conjunction with method 400. For example, another method may proceed from 404 of method 400 to 504 of method 500. Method 500 may be stored as executable instructions in non-transitory memory of control unit 16 shown in FIG. 1.

At 502, method 500 includes flowing exhaust through the primary filter, similar to method 400 at 404. For example, particulate filter 4 may be operating in the normal mode at 502, and valve 11 may be fully open such that at least a majority of engine exhaust enters primary filter 5. As described above, while valve 11 is fully open, a small leakage flow may enter secondary filter 9. Alternatively, a further valve or valves may be arranged upstream of secondary filter 9 and controlled to prevent leakage flow.

After 502, method 500 continues to 504 to determine whether primary filter regeneration is desired. For example, if the primary filter is not overloaded, or if exhaust-gas counter-pressure is at an acceptable level, primary filter regeneration may not be desired. It will be appreciated that primary filter regeneration may not be desired under other conditions as well without departing from the scope of the present disclosure. If primary filter regeneration is not desired, method 500 returns to 502 to continue flowing exhaust through the primary filter.

However, if primary filter regeneration is desired, method 500 proceeds from 504 to 506. At 506, method 500 includes flowing at least some exhaust through the secondary filter while regenerating the primary filter. For example, 506 may correspond to 406 of method 400 in that a valve such as valve 11 may be closed to effect the flowing of exhaust through the secondary filter. While valve 11 may be fully closed such that no exhaust may enter through the primary filter, for example in the fail-safe mode, in other examples valve 11 may only be partially closed and some exhaust may continue to flow through the primary filter. It may be advantageous to continuing to flow some exhaust through the primary filter during regeneration. For example, the flow of exhaust through the filter may help to distribute quenching agent that is injected and thereby improve the dissipation of heat in the filter, among other benefits. On the other hand, it may be advantageous to ensure that no exhaust flows through the primary filter during regeneration during certain conditions.

After 506, method 500 proceeds to 508. At 508, method 500 includes injecting quenching agent into the primary filter at a rate based on one or more of exhaust pressure, exhaust temperature, exhaust composition, and an opening degree of a valve distributing exhaust flow between the primary and secondary filters. In one example, control unit 16 may determine an appropriate quenching agent injection rate based on information from one or more sensors 17, e.g. exhaust sensors. It may be desirable to inject quenching agent at a higher rate when exhaust temperature is high. Alternatively or additionally, the rate of quenching agent injection may be based on an opening degree of a valve such as valve 11. For example, in the mixed mode, it may be advantageous to tailor the rate of quenching agent injection to the amount of exhaust flowing through the primary filter during regeneration, to more precisely control the regeneration.

After 508, method 500 proceeds to 510. At 510, method 500 includes determining whether engine shutdown is initiated during the regeneration. For example, control system 15 may initiate a regeneration process due to a fault condition of the primary filter. While the regeneration process is underway, a vehicle operator may shut down the engine, for example when parking. It will be appreciated that the determination of whether engine shutdown has been initiated may be repeated periodically throughout regeneration of the primary filter.

If engine shutdown is not initiated during regeneration, method 500 ends, and the regeneration continues to completion. However, if engine shutdown is initiated during regeneration, method 500 proceeds from 510 to 512 to increase the rate of quenching agent injection. For example, if regeneration continues after engine shutdown, exhaust may no longer flow through the filter and thus filter temperature may be undesirably high. As described herein, excessive heat in the filter may result in soot combustion which may damage the exhaust system, for example. Moreover, the heat of regeneration in the primary filter may be particularly hazardous at engine shutdown, for example when the vehicle is parked in an area with obstructions near the tail pipe or other exhaust system components. If the obstructions are flammable, for example tall grass, the heat of the regenerating filter and/or particle combustions in the filter caused by the heat may start a fire. Therefore, the increase in filter temperature due to engine shutdown may be in a sense pre-empted by increasing the rate of quenching agent injection when it is determined that engine shutdown has been initiated. In other examples, rather than increasing the rate of quenching agent injection, quenching agent injection may be otherwise adjusted if engine shutdown is initiated during regeneration.

After 512, method 500 proceeds to 514. At 514, method 500 includes determining whether the temperature of the primary filter at engine shutdown exceeds a threshold. For example, the threshold may be a temperature at which a likelihood of undesirable consequences of engine shutdown during filter regeneration is low.

If the answer at 514 is no, method 500 proceeds from 514 to 516. At 516, method 500 includes stopping quenching agent injection at shutdown. For example, increasing the rate of quenching agent injection upon initiation of engine shutdown may sufficiently reduce the temperature of the primary filter, such that further quenching agent injection is not required after engine shutdown.

However, if the answer at 514 is yes, method 500 proceeds from 514 to 518. At 518, method 500 includes continuing quenching agent injection until the temperature of the primary filter is less than the threshold. For example, despite having increased the rate of quenching agent injection upon initiation of engine shutdown, the temperature of the primary filter may still be too high at the time engine shutdown occurs. As such, it may be desirable to continue quenching agent injection into the primary filter even after the engine has shut down. For example, energy stored in an energy storage device (not shown) such as a vehicle battery may power the quenching agent injection nozzle such that it may continue to dose quenching agent after the engine has stopped operating. Once the temperature of the primary filter falls below the threshold, quenching agent injection may be stopped, and regeneration may continue until completion while the engine remains in a shut down state. After 518, method 500 ends.

It will be appreciated that methods 400 and 500 are provided by way of example, and thus, are not meant to be limiting. Therefore, it is to be understood that methods 400 and 500 may include additional and/or alternative steps than those illustrated in FIGS. 4 and 5, respectively, without departing from the scope of this disclosure. Further, it will be appreciated that methods 400 and 500 are not limited to the order illustrated; rather, one or more steps may be rearranged or omitted without departing from the scope of this disclosure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the example routines may graphically represent code to be programmed into the computer readable storage medium in the controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A particulate filter for a vehicle exhaust system, comprising:
   a primary filter, a secondary filter, and a quenching agent injection nozzle arranged upstream of the primary filter; and
   an exhaust-gas path running through the primary filter in a normal mode and through the secondary filter in a fail-safe mode;
   wherein in the fail-safe mode, the quenching agent injection nozzle delivers pressurized nitrogen or water to the primary filter.

2. The particulate filter of claim 1, wherein the particulate filter is operated in the fail-safe mode during an overload of the primary filter.

3. The particulate filter of claim 2, wherein the secondary filter surrounds the primary filter.

4. The particulate filter of claim 3, wherein a valve for diverting the exhaust-gas path is arranged upstream of the primary filter.

5. The particulate filter of claim 4, wherein a further valve for diverting the exhaust-gas path is arranged upstream of the secondary filter.

6. The particulate filter of claim 3, wherein the quenching agent injection nozzle is arranged in an inlet region of the primary filter, and wherein the inlet region of the primary filter is downstream of an inlet region of the secondary filter.

7. The particulate filter of claim 6, wherein the primary filter comprises either a wall-flow filter or a through-flow filter, and/or wherein the secondary filter comprises either a wall-flow filter or a through-flow filter.

8. The particulate filter of claim 1, further comprising an exhaust-gas path running through the primary filter and an exhaust-path running through the secondary filter in a mixed mode, wherein the quenching agent injection nozzle delivers quenching agent to the primary filter in the mixed mode.

9. A method for purification of an exhaust-gas flow of an engine of a vehicle, comprising:

flowing exhaust gas through a primary filter; flowing exhaust gas through a secondary filter during an overload of the primary filter; and injecting a quenching agent into the primary filter during the overload of the primary filter;

wherein the quenching agent comprises pressurized nitrogen or water.

10. The method of claim 9, wherein the exhaust-gas flow is distributed between the primary filter and the secondary filter by means of a valve.

11. The method of claim 10, wherein the valve regulates an oxygen concentration in the exhaust-gas flow.

12. The method of claim 9, wherein the quenching agent regulates an oxygen concentration in the exhaust-gas flow.

13. The method of claim 9, wherein the quenching agent forms a heat sink for the exhaust-gas flow.

14. The method of claim 9, wherein the primary filter is a wall-flow filter and the secondary filter is a through-flow filter.

15. The method of claim 14, further comprising regenerating the primary filter during the overload and adjusting injection of the quenching agent if engine shutdown is initiated during the regeneration.

16. A method for purification of engine exhaust, comprising:

flowing exhaust through a primary filter; and when regeneration of the primary filter is desired:

flowing at least some of the exhaust through a secondary filter surrounding the primary filter while regenerating the primary filter;

injecting a quenching agent into the primary filter; and adjusting the quenching agent injection if engine shutdown is initiated during the regeneration;

wherein the quenching agent comprises pressurized nitrogen or water.

17. The method of claim 16, wherein a rate of the quenching agent injection is based on one or more of exhaust pressure, exhaust temperature, exhaust composition, and an opening degree of a valve distributing exhaust flow between the primary filter and the secondary filter.

18. The method of claim 17, wherein adjusting the quenching agent injection if engine shutdown is initiated during the regeneration comprises increasing the rate of the quenching agent injection.

19. The method of claim 16 further comprising, if engine shutdown is initiated during the regeneration, continuing the quenching agent injection after shutdown if a temperature of the primary filter exceeds a threshold at shutdown, and stopping the quenching agent injection once the temperature of the primary filter falls below the threshold.

* * * * *